(No Model.)  2 Sheets—Sheet 1.

G. D. SANFORD.
FIRE PLACE HEATER.

No. 253,315. Patented Feb. 7, 1882.

Attest,
James H. Hunter.
Elwyn S. Wailler.

Inventor:
George D. Sanford (No Model.) 2 Sheets—Sheet 2.

G. D. SANFORD.
FIRE PLACE HEATER.

No. 253,315. Patented Feb. 7, 1882.

Attest.
James H. Hunter.
Elwyn S. Miller.

Inventor:
George D. Sanford.

N. PETERS, Photo-Lithographer, Washington, D. C.

UNITED STATES PATENT OFFICE.

GEORGE D. SANFORD, OF PEEKSKILL, ASSIGNOR OF ONE-HALF TO WATSON SANFORD, OF BROOKLYN, NEW YORK.

FIRE-PLACE HEATER.

SPECIFICATION forming part of Letters Patent No. 253,315, dated February 7, 1882.

Application filed December 5, 1881. (No model.)

*To all whom it may concern:*

Be it known that I, GEORGE D. SANFORD, of Peekskill, in the county of Westchester and State of New York, have invented certain new and useful Improvements in Fire-Place Heaters, which improvements are fully set forth in the following specification and accompanying drawings.

These improvements consist in a frame arranged on the front of the heater and through which the heat passes to the apartment in which the heater is placed.

Figure 1:
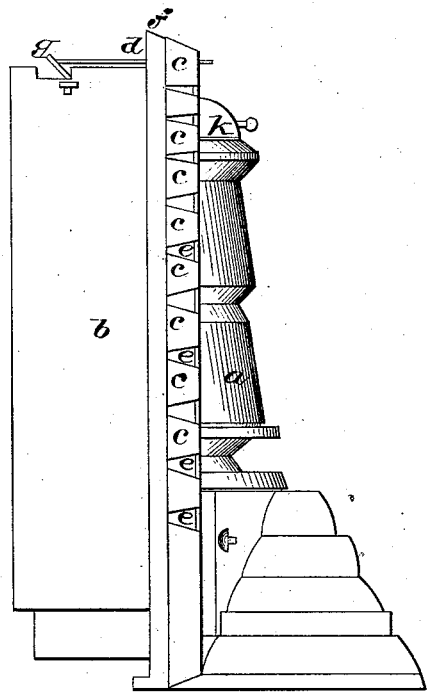
Figure 2:
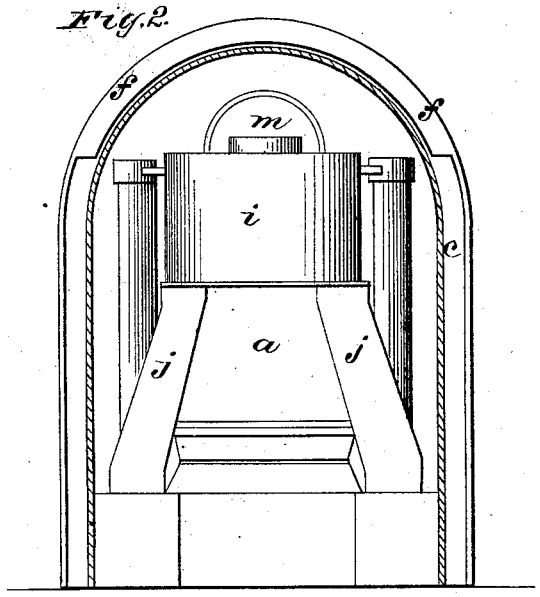
Figure 3:
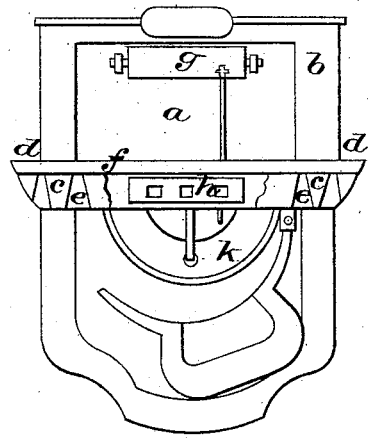
Figure 4:
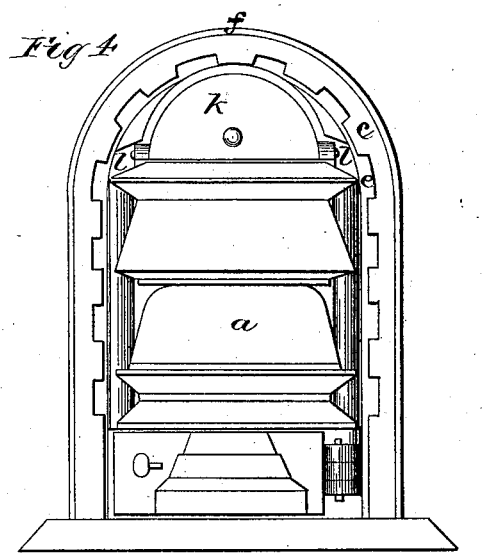
Figure 5:
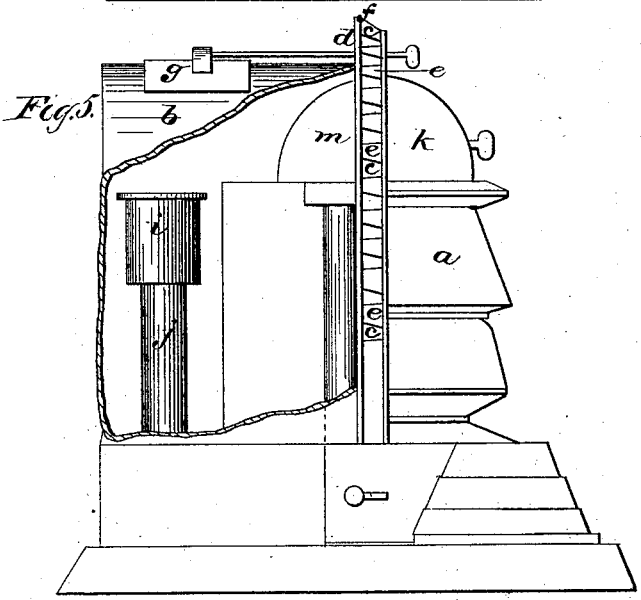

In the drawings, which serve to illustrate my improvements, Figure 1 is a side view of my improved heater. Fig. 2 is a rear view of the same. Fig. 3 is a top plan view. Fig. 4 is a front elevation. Fig. 5 is a side view of the heater, showing the casing broken away.

$a$ is the body of the heater. $b$ is the exterior casing surrounding such body.

$c$ is a frame placed around the front edge, $d$, of the casing in a position about where the front wall of the fire-place joins with the casing. This frame will project beyond the front wall and into the room, and has cast all around it the series of open spaces $e\ e$, &c. $d$ is a division-plate connecting this frame with the top edge of the casing. At the rear and in the top of the casing is a damper, $g$, by which the heat is allowed to escape through a pipe into the upper apartment of the house. In the front of this division-plate and within the casing is a damper, $h$, by which the heat is allowed to come forward and through the open spaces $e\ e$, &c., of the frame $c$, and into the apartment in which the heater is placed, thereby preventing the absorption of heat by the brick-work of the flue.

$i$ is a chamber or drum located at the apex of the two smoke-pipes $j\ j$ at the rear of the body of the heater and within the casing $b$, into which the products of combustion will be drawn and the heat more fully radiated therefrom on its passage to the chimney into the heat-reservoir inside of the casing $b$, because of the extra radiating surface obtained by the use of such drum.

$k$ is a section of a hollow sphere, which is located over and covers the feed-opening of the heater. It turns on trunnions $l\ l$ over another section, $m$, of the hollow sphere when it is desired to introduce coal into the feed-magazine or the fire-pot of the heater. When the part $k$ is drawn down, so as to close the feed-opening, the construction has the appearance of one half of a hollow sphere, and I term it a "helmet-top magazine feed-cover."

I claim—

An extension-frame, $c$, constructed with a series of open spaces, $e$, in combination with the division-plate $f$ and the casing of a fire-place heater, substantially as and for the purpose described.

GEORGE D. SANFORD.

Witnesses:
 JAMES H. HUNTER,
 E. S. MAILLER.